US011939228B1

(12) United States Patent
Shaalan et al.

(10) Patent No.: US 11,939,228 B1
(45) Date of Patent: Mar. 26, 2024

(54) METHOD OF MAKING RUTILE/ANATASE TIO2 LAYER VIA CO2 LASER

(71) Applicant: KING FAISAL UNIVERSITY, Al-Ahsa (SA)

(72) Inventors: Nagih Shaalan, Al-Ahsa (SA); Chawki Awada, Al-Ahsa (SA); Faheem Ahmed, Al-Ahsa (SA); Shalendra Kumar, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/141,863

(22) Filed: May 1, 2023

(51) Int. Cl.
| | | |
|---|---|---|
| *C23C 8/10* | (2006.01) | |
| *C01G 23/047* | (2006.01) | |
| *C23C 22/05* | (2006.01) | |
| *C23C 22/78* | (2006.01) | |
| *C23C 22/82* | (2006.01) | |
| *C23C 8/06* | (2006.01) | |

(52) U.S. Cl.
CPC ............ *C01G 23/047* (2013.01); *C23C 22/05* (2013.01); *C23C 22/78* (2013.01); *C23C 22/82* (2013.01); *C01P 2002/82* (2013.01); *C01P 2006/80* (2013.01)

(58) Field of Classification Search
CPC ................................................. C23C 8/02–10
See application file for complete search history.

(56) References Cited

U.S. PATENT DOCUMENTS

| | | | |
|---|---|---|---|
| 5,053,580 A | 10/1991 | Schramm et al. | |
| 2004/0132603 A1* | 7/2004 | Narhi ................... | A61L 27/306 501/63 |
| 2010/0308286 A1 | 12/2010 | Herlin et al. | |

FOREIGN PATENT DOCUMENTS

| | | |
|---|---|---|
| BR | 102016005946 B1 | 7/2022 |
| CN | 101071927 A | 11/2007 |

OTHER PUBLICATIONS

Chung, C.K. et al., "Effect of solution contents on the evolution of microstructure and photoluminescence of laser-annealed rutile TiO2 thin films," J. of Alloys and Compounds 574: pp. 83-87 2013.
Moritz, N. et al., "TF-XRD examination of surface-reactive TiO2 coatings produced by heat treatment and CO2 laser treatment," Biomaterials 26(21): pp. 4460-4467 2005.
Rossi, S. et al., "Comparison between sol-gel-derived anatase- and rutile-structured TiO2 coatings in soft-tissue environment," J. of Biomedical Materials Research Part A 82A(4): pp. 965-974 2007.

(Continued)

*Primary Examiner* — Lois L Zheng
(74) *Attorney, Agent, or Firm* — Nath, Goldberg & Meyer; Richard C. Litman

(57) ABSTRACT

Methods of obtaining a titanium dioxide nanofilm or microfilm are provided herein. A pure sheet of titanium is irradiated with a $CO_2$ laser to produce the titanium dioxide nanofilm or microfilm. The titanium sheet can optionally be doped with an oxide, such as barium oxide. The method produces titanium dioxide nanofilms or microfilms that can be produced in more than one phase, such as a rutile phase, an anatase phase, or both combined. The titanium dioxide nanofilms or microfilms can be directly fabricated with high purity without any further processing.

13 Claims, 6 Drawing Sheets

(56) References Cited

OTHER PUBLICATIONS

Park, J. et al., "Effects of Laser Irradiation on Machined and Anodized Titanium Disks," Int. J. of Oral & Maxillofacial Implants 27(2): 265-272 (2012).

Medvids, A. et al., "Anatase or rutile TiO2 nanolayer formation on Ti substrates by laser radiation: Mechanical, photocatalytic and antibacterial properties," Optics & Laser Tech. 138: 106898 2021.

* cited by examiner

METHOD OF MAKING RUTILE/ANATASE TIO2 LAYER VIA CO2 LASER

BACKGROUND

1. Field

The disclosure of the present patent application relates to method of fabricating titanium dioxide ($TiO_2$) thin and thick films, as well as the thus produced titanium dioxide thin and thick films.

DESCRIPTION OF THE PRIOR ART

Titanium dioxide ($TiO_2$) is one of the important and widely used oxides in many applications. It is used in the manufacture of many devices and products, including solar cells, semiconductors, antibacterial surfaces, surface cleaning products, and others. However, titanium dioxide can cause inflammation, cell death, and DNA damage in mammalian cells under sunlight or ultraviolet light. Since light gives it antibacterial properties, it can damage living cells by direct chemical oxidation. $TiO_2$ is produced in more than one phase, the most famous of which are rutile and anatase phases. It can be identified by x-rays or using Raman spectroscopy.

One possible application for titanium dioxide in the form of a powder with nanometric particles is photocatalysis. Photocatalysis makes it possible to carry out chemical reactions in the presence of light. Its principal rests on the generation of electron-hole pairs in the semiconducting material by absorption of photons of which the energy is at least equal to the electronic gap of the material. These charge carriers will then react with chemical species on the surface of the material. It will then be understood that the positions of the edges of the valence and conduction band of the material then have great importance in performing the expected reaction.

Titanium dioxide, in its anatase crystallographic form, is one of the materials most employed in photocatalysis, in particular on account of its chemical stability. More generally, titanium oxide is appreciated for its high optical absorption capacities.

Currently, a problem with titanium dioxide is that, in the crystallographic phase of the "anatase" type of the material, the optical gap can be as high as 3.2 eV. Since ultraviolet light (UV) only represents a small part of the solar spectrum, the possibility has been studied of synthesizing $TiO_2$ nanoparticles with a shifted gap, advantageously below 3 eV in order better to take advantage of the optical absorption capacities of $TiO_2$, typically in order to reach UV absorption notably within the range 290-350 nm or even up to 450 nm. One solution is to dope the $TiO_2$ material with transition metals or with anionic species such as nitrogen (N). However, preparation of these nanoparticles requires several chemical treatment steps that are cumbersome to put into operation.

While methods for the production of thin or thick films of titanium dioxide are currently known, they often involve multiple chemical processes, the use of expensive lasers which are not widely available, reactions at high temperatures, the use of external heat or gases, or the like. This makes the currently known processes difficult and/or expensive.

Thus, methods to solve the aforementioned problems are desired.

SUMMARY OF THE INVENTION

The present subject matter relates to a new method for fabricating titanium dioxide ($TiO_2$) thin and thick films. The method is based on the use of a $CO_2$ laser beam of 10.5 μm. The $TiO_2$ thin and thick films are fabricated based on a titanium (Ti) sheet. The surface of the Ti sheet can be treated in advance of the fabrication process. The $TiO_2$ fabrication can be carried out by the $CO_2$ laser using various laser powers. The $TiO_2$ fabrication can also be carried out using various speed scans of the laser beam. The method is not limited to $TiO_2$, but can also be extended to $TiO_2$ doped materials, such as Barium oxide materials. By controlling the power and speed of the laser beam, the phase obtained for $TiO_2$ can be controlled.

According to the present processes, $TiO_2$ can be directly fabricated without any further processing with high purity. The method can be applied for large scale fabrication of $TiO_2$. The $CO_2$ laser is unexpected for oxidizing metallic materials; however, a Ti sheet can be used herein to fabricate $TiO_2$. The control of forming a rutile or anatase phase of the titanium dioxide is one of the advantages of the present methods. The present methods are simple and can be handled by researchers or non-academic people.

Accordingly, in one embodiment, the present subject matter relates to a method of preparing a titanium dioxide nanofilm or microfilm, the method comprising: providing a sheet of titanium (Ti); cleaning the sheet of titanium with deionized water and ethanol to obtain a sheet of treated titanium; irradiating the treated sheet of titanium with a $CO_2$ laser; and obtaining the titanium dioxide nanofilm or microfilm.

In another embodiment, the present subject matter relates to a titanium dioxide nanofilm or microfilm produced according to the present methods.

These and other features of the present subject matter will become readily apparent upon further review of the following specification.

DETAILED DESCRIPTION

Figure 1:
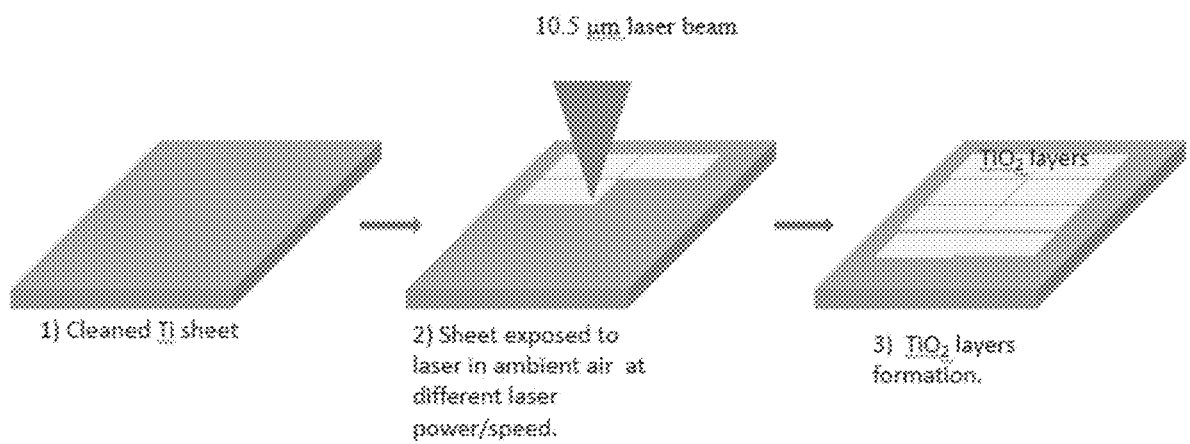
FIG. 1 shows a summary of the present fabrication process for preparing the titanium dioxide nanofilms and microfilms.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a new method for fabricating titanium dioxide ($TiO_2$) thin and thick films. The method is based on the use of a $CO_2$ laser beam of 10.5 μm. The $TiO_2$ thin and thick films are fabricated based on a titanium (Ti) sheet. The surface of the Ti sheet can be treated in advance of the fabrication process. The $TiO_2$ fabrication can be carried out by the $CO_2$ laser using various laser powers. The $TiO_2$ fabrication can also be carried out using various speed scans of the laser beam. The method is not limited to $TiO_2$, but can also be extended to $TiO_2$ doped materials, such as barium oxide materials. By controlling the power and speed of the laser beam, the phase obtained for $TiO_2$ can be controlled.

In an embodiment, the present methods can be summarized as shown in FIG. 1. Accordingly, in one embodiment, the present subject matter relates to a method of preparing a titanium dioxide nanofilm or microfilm, the method comprising: providing a sheet of titanium (Ti); cleaning the sheet of titanium with deionized water and ethanol to obtain a sheet of treated titanium; irradiating the treated sheet of titanium with a $CO_2$ laser; and obtaining the titanium dioxide nanofilm or microfilm.

In one embodiment, the treated sheet of titanium is irradiated with a $CO_2$ laser having a wavelength of about 10.5 μm, a power of about 15 to about 40 W, and a speed of about 5 mm/s to about 400 mm/s. In further embodiments, the $CO_2$ laser has a power of about 15 to about 30 W, and a speed of about 5 mm/s to about 17 mm/s. In another embodiment, the $CO_2$ laser is about 50 mm from the treated sheet of titanium during the irradiation step. The $CO_2$ laser can be an infrared laser producing a high temperature, thereby oxidizing the Ti surface when it is exposed to the laser beam.

In another embodiment, the sheet of titanium has a thickness of about 0.1 mm. This can result in a titanium dioxide nanofilm or microfilm having a thickness of a few nanometers to a few microns.

In one embodiment, the treated sheet of titanium is doped with an oxide prior to the irradiating step. In this regard, prior to the irradiating step, the method can further comprise preparing an oxide solution in deionized water; and dropwise coating the treated sheet of titanium to form a thin layer of the oxide on the treated sheet of titanium. In an embodiment, by way of non-limiting example, the oxide can be barium oxide.

In a further embodiment, the method can be conducted at ambient conditions. Further, the method can be carried out without applying any external heat or gases, either before or during the laser process.

In an embodiment, a surface of the treated sheet of titanium exposed to the laser irradiation is oxidized when exposed to the laser irradiation, thus forming the titanium dioxide. The thus-produced titanium dioxide nanofilm or microfilm can comprise rutile titanium dioxide, anatase titanium dioxide, or rutile-anatase titanium dioxide.

In another embodiment, the sheet of titanium used as a starting material can have a purity of at least 95%, or a purity of about 99.95%. Since the present methods can use such a high purity source, it is also possible to obtain high purity products, since no other impurities are used during or included in the fabrication process.

Further contemplated, according to the present subject matter, are titanium dioxide nanofilms or microfilms produced according to the present methods. In this regard, the produced titanium dioxide nanofilm or microfilm can have antibacterial properties.

EXAMPLES

Example 1

Synthesis Methods

A $CO_2$ laser with a laser wavelength of 10.5 μm, which is associated with a power of 40 W as a maximum power and a head of 400 mm/s as a maximum speed was used. A Ti sheet of 0.1 mm in thickness was well cleaned with water and ethanol and subjected to the laser beam with selective laser power and speed. The distance between the sheet and laser head was 50 mm.

Also obtained was a titanium dioxide film having a surface functionalized with barium oxide. For this product, barium oxide with a concentration of $10^{-3}$M was prepared with deionized water (DI). 0.5 ml of the thus-produced barium oxide solution was dropwise coated on a Ti sheet to form a thin layer. Then, the sheet was subjected to the laser beam, as described above.

Different titanium dioxide thin or thick films were obtained using a laser power between 15 and 30 W, and a laser speed of between 5 mm/s and 17 mm/s, as described in Table 1.

TABLE 1

| Laser power (W) | Speed (mm/s) | Growth |
| --- | --- | --- |
| 15-25 | 8 | $TiO_2$ Rutile phase |
| 25 | 10-15 | $TiO_2$ Rutile phase |
| 25 | >15 | None |
| <15 | 8 | None |
| BaO surface functionalizing | | |
| 20-30 | 5 | Mixed Rutile/Anatase phases |

Example 2

Analysis of Obtained Products

Raman spectra were conducted using a confocal Raman microscope (LabRAM HR800) connected to a multichannel charge-coupled detector (CCD). A red laser He—Ne with a wavelength of 632.8 nm and with 2 mW output power was used as a source of excitation. The Raman spectra were measured at ambient temperature in a backscattering configuration with a spectral resolution of around 0.33 cm$^{-1}$. Raman spectra confirmed the observation of phonon modes attributed to the rutile phase of $TiO_2$. The latter confirms the synthesis of the rutile phase by irradiating the Ti sheet with a high power $CO_2$ laser, as shown in FIGS. 2 and 3.

Figure 2A:
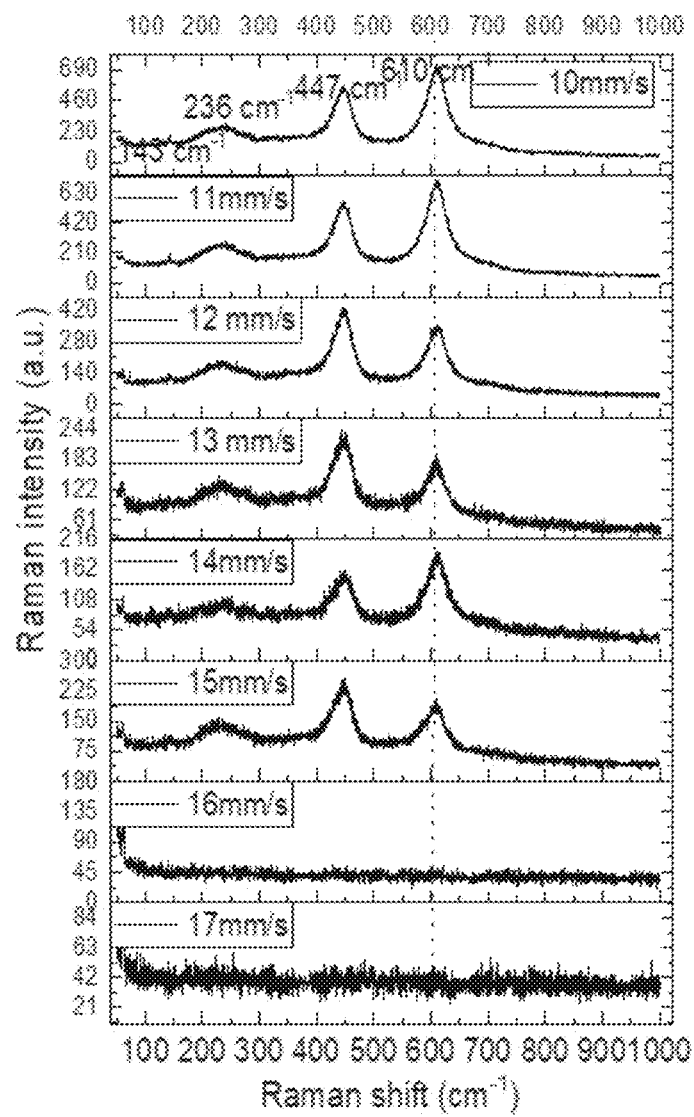
FIGS. 2A-C show: A) Raman spectra performed on the Laser-induced Ti foil with different Laser scan speed; B) Intensity ratios of $I_{610/447}$ versus Laser scan speed at a power of 25 Watt; and C) a photo of fabricated films.
Figure 2B:
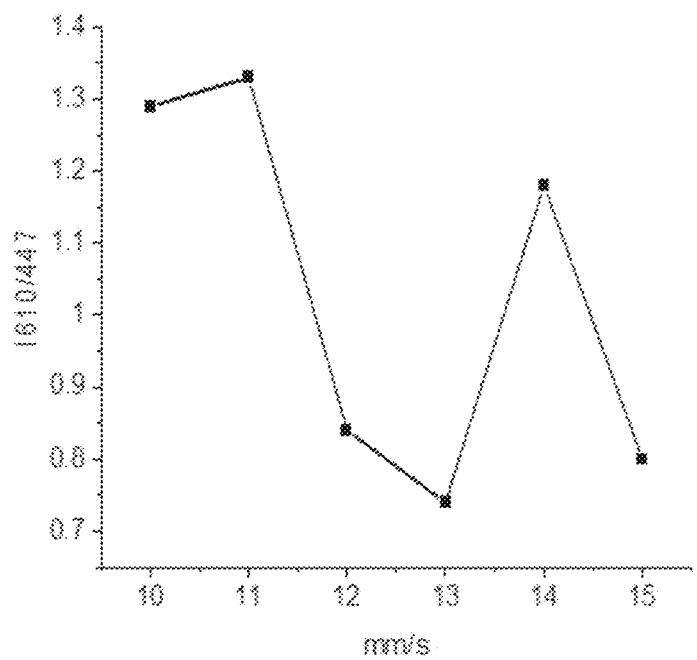
Figure 2C:
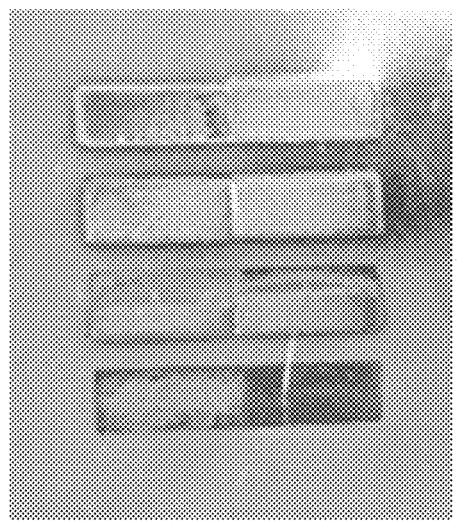

Specifically, FIGS. 2A-2C show: A) Raman spectra performed into the Laser-induced Ti foil with different Laser scan speed; B) Intensities ratio $I_{610/447}$ versus Laser scan speed, at a power of 25 W; and C) a photo of thus fabricated films.

Figure 3A:
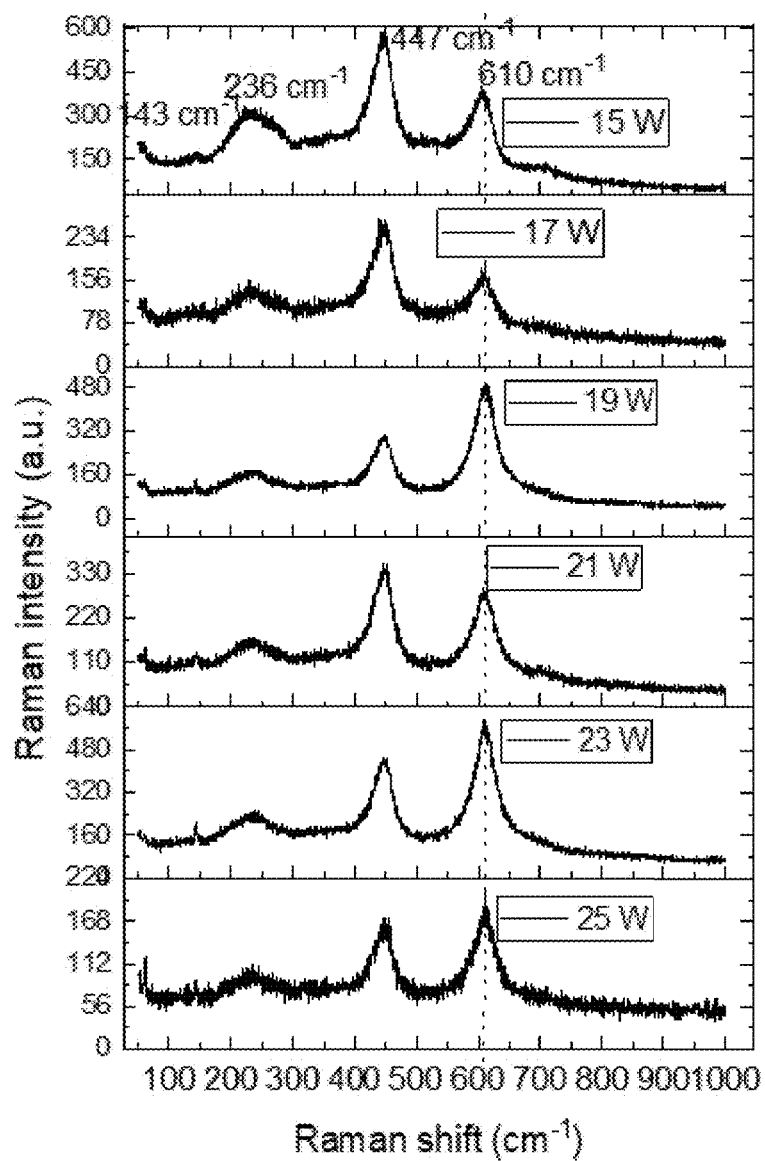
FIGS. 3A-3C show: A) Raman spectra performed on the Laser-induced Ti sheet with different powers; B) Intensity ratios of $I_{610/447}$ versus laser power at a speed of 8 mm/s; and C) a photo of fabricated films.
Figure 3B:
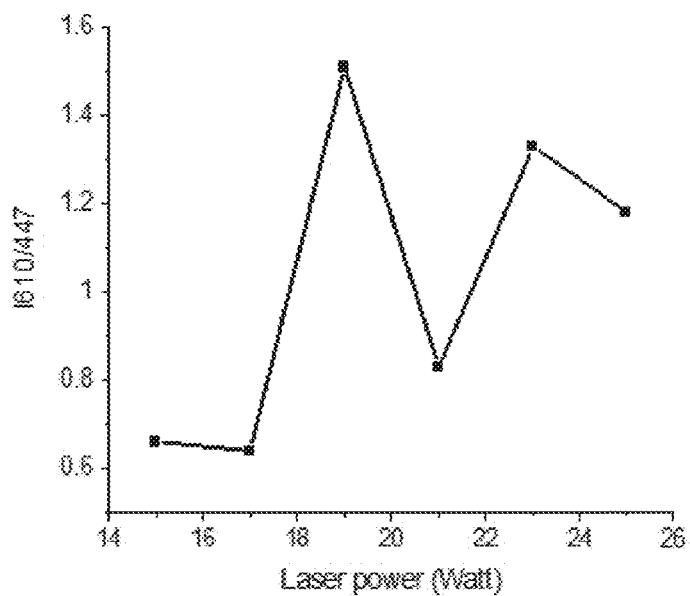
Figure 3C:

Further, FIGS. 3A-3C show: A) Raman spectra performed on the Laser-induced Ti sheet with different powers; B) Intensity ratios of $I_{610/447}$ versus laser power at a speed of 8 mm/s; and C) a photo of fabricated films.

Figure 4:
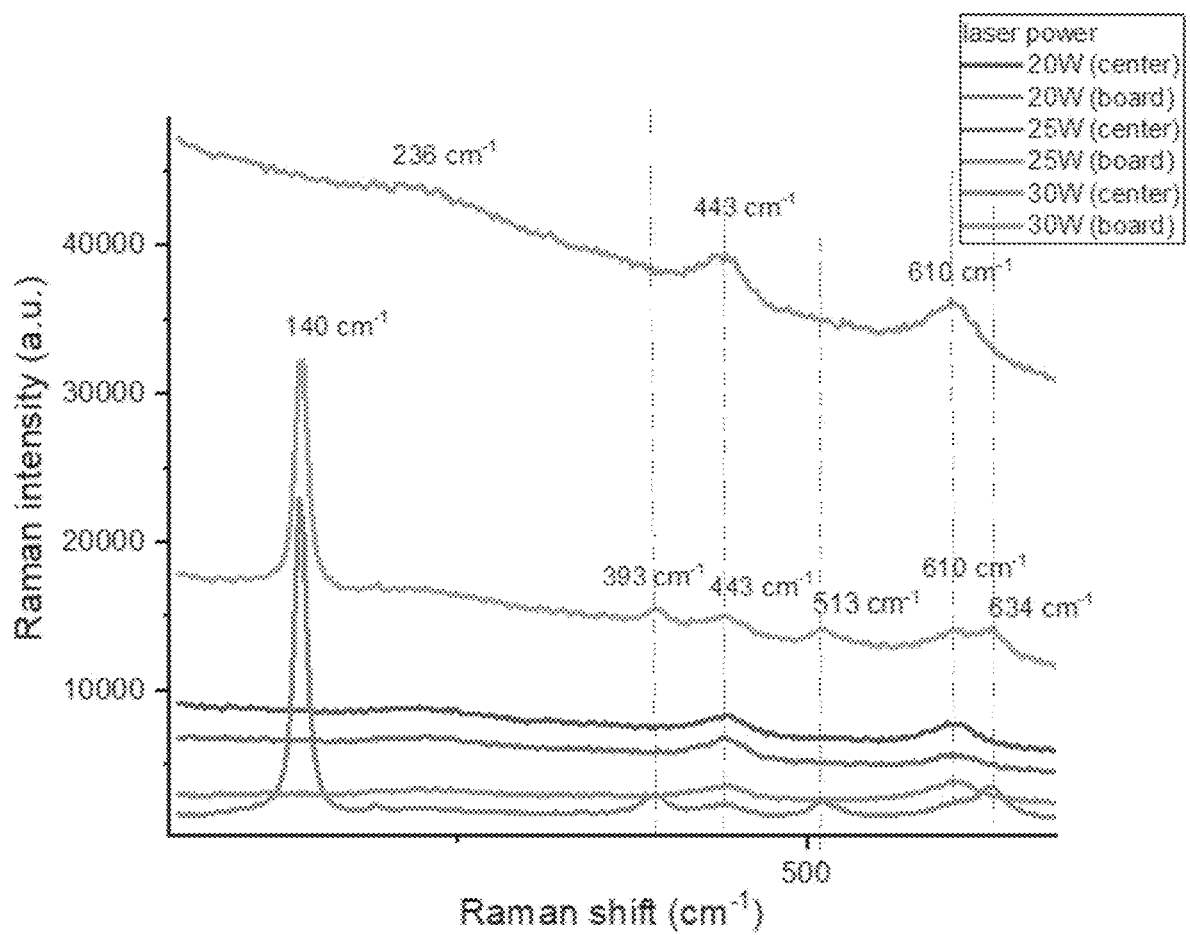
FIG. 4 is a chart showing mixed anatase/rutile titanium dioxide in the board and pure rutile in the center after adding barium oxide with a concentration of $10^{-3}$M. Power was changed from 20-30 W at a laser speed of 5 mm/s.

FIG. 4 is a chart showing mixed anatase/rutile titanium dioxide in the board and pure rutile in the center after adding barium oxide with a concentration of $10^{-3}$M. Power was changed from 20-30 W at a laser speed of 5 mm/s.

It is to be understood that the methods of fabricating titanium dioxide films are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing a titanium dioxide nanofilm or microfilm, the method comprising:
   providing a sheet of titanium (Ti) having a thickness of about 0.1 mm;
   cleaning the sheet of titanium with deionized water and ethanol to obtain a sheet of treated titanium;
   irradiating the treated sheet of titanium with a CO2 laser; and
   obtaining the titanium dioxide nanofilm or microfilm;
   wherein the titanium dioxide nanofilm or microfilm comprises rutile titanium dioxide, anatase titanium dioxide, or rutile-anatase titanium dioxide.

2. The method of claim 1, wherein the treated sheet of titanium is irradiated with a CO2 laser having a wavelength of about 10.5 μm, a power of about 15 to about 40 W, and a speed of about 5 mm/s to about 400 mm/s.

3. The method of claim 2, wherein the $CO_2$ laser has a power of about 15 to about 30 W, and a speed of about 5 mm/s to about 17 mm/s.

4. The method of claim 1, wherein the $CO_2$ laser is about 50 mm from the treated sheet of titanium during the irradiation step.

5. The method of claim 1, wherein the titanium dioxide nanofilm or microfilm has a thickness of a few nanometers to a few microns.

6. The method of claim 1, wherein the treated sheet of titanium is doped with an oxide prior to the irradiating step.

7. The method of claim 6, wherein, prior to the irradiating step, the method further comprises preparing an oxide solution in deionized water; and dropwise coating the treated sheet of titanium to form a thin layer of the oxide on the treated sheet of titanium.

8. The method of claim 7, wherein the oxide is barium oxide.

9. The method of claim 1, wherein the method is conducted at ambient conditions.

10. The method of claim 1, wherein a surface of the treated sheet of titanium exposed to the laser irradiation is oxidized when exposed to the laser irradiation.

11. The method of claim 1, wherein the sheet of titanium has a purity of at least 95%.

12. The method of claim 11, wherein the sheet of titanium has a purity of about 99.95%.

13. A titanium dioxide nanofilm or microfilm produced according to the method of claim 1.

\* \* \* \* \*